2 Sheets—Sheet 1.
J. CURLEY & W. F. WARREN.
Well-Auger.
No. 210,301. Patented Nov. 26, 1878.
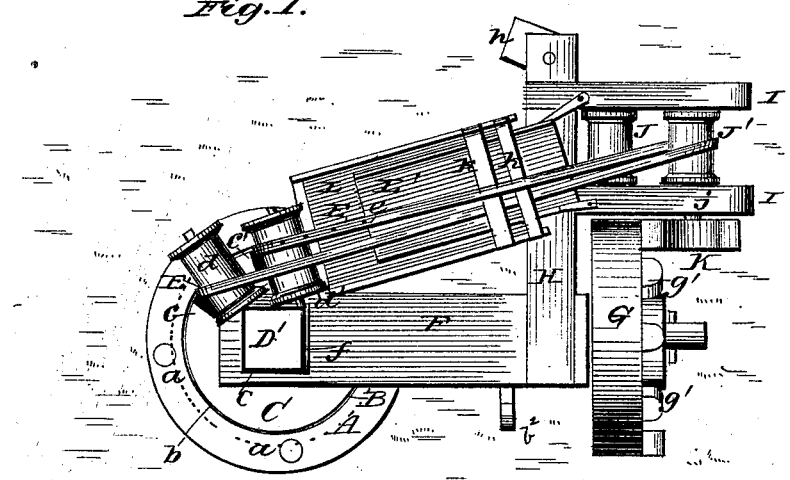
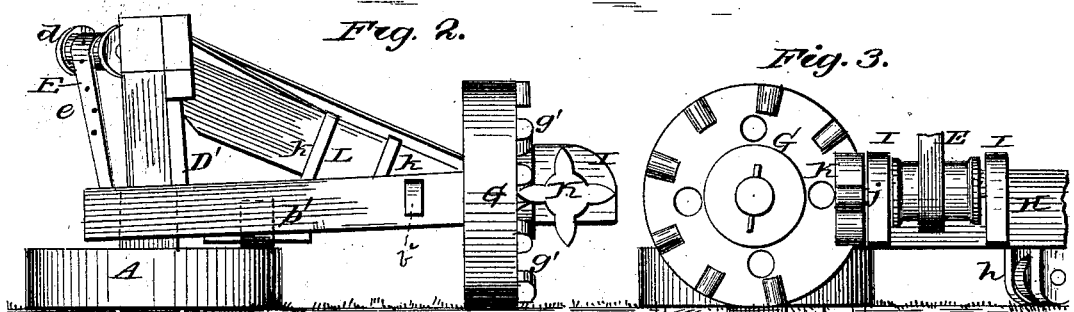
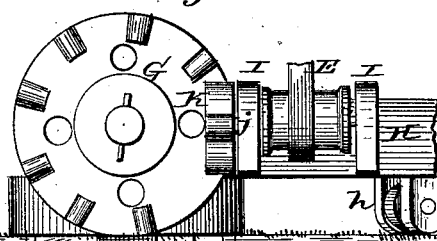
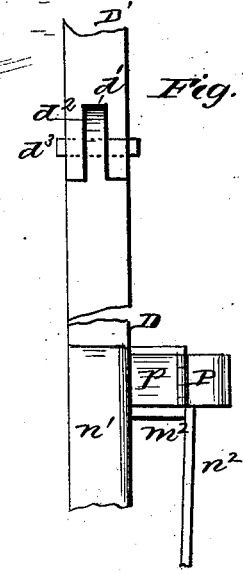
Witnesses
Fred. G. Dietrich
Jno. P. Brooks
Inventors
James Curley
Walter F. Warren
by De Witt C. Allen
atty.
N. PETERS, PHOTO-LITHOGRAPHER, WASHINGTON, D. C.

2 Sheets—Sheet 2.
J. CURLEY & W. F. WARREN.
Well-Auger.
No. 210,301.  Patented Nov. 26, 1878.
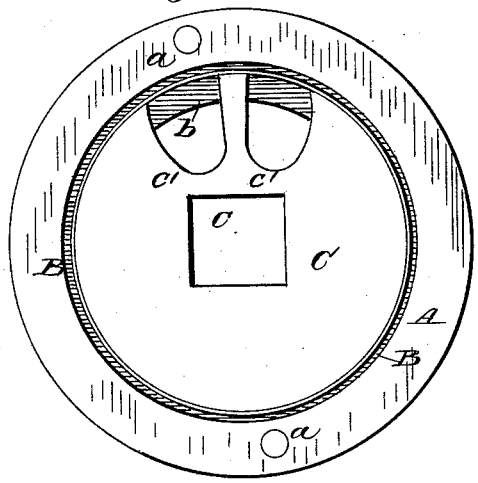
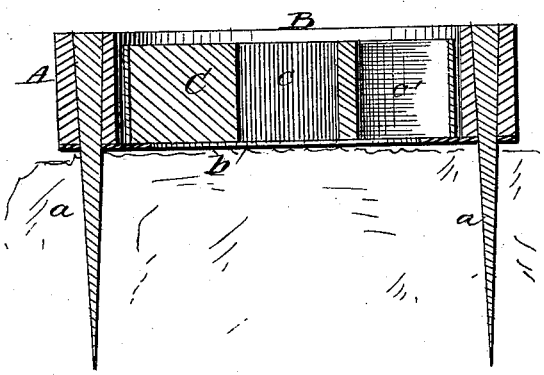
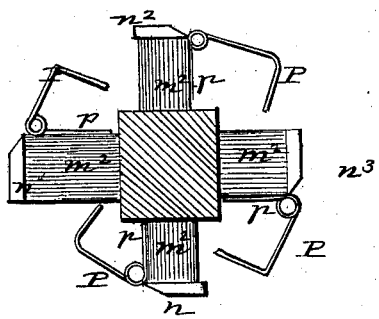
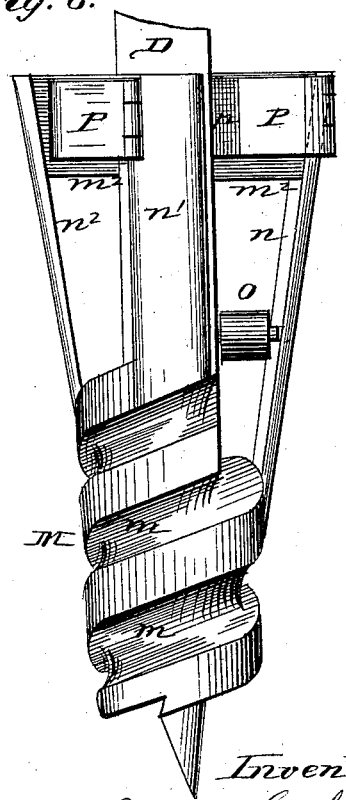
Witnesses
Rd. G. Dieterich
George Binkenburg
Inventors
James Curley,
and
Wm F. Warren
by DeWitt C Allen atty

UNITED STATES PATENT OFFICE.

JAMES CURLEY AND WALTER F. WARREN, OF HENNING, TENNESSEE.

IMPROVEMENT IN WELL-AUGERS.

Specification forming part of Letters Patent No. 210,301, dated November 26, 1878; application filed September 24, 1878.

*To all whom it may concern:*

Be it known that we, JAMES CURLEY and WALTER F. WARREN, of Henning, in the county of Lauderdale and State of Tennessee, have invented certain new and useful Improvements in Well-Augers or Earth-Boring Machines; and we do hereby declare the following to be a full, clear, and exact description of the same, reference being made to the accompanying drawing, forming a part of this specification, and in which—

Figure 1 is a top view of our improved machine. Fig. 2 is a side elevation of the same. Fig. 3 is a partial end view of the same. Fig. 4 is a detached view, showing the manner of connecting the sections of the auger-shaft. Fig. 5 is a vertical section through the circular ground plate A and disk C. Fig. 6 is a top or plan view of said plate and disk. Fig. 7 is a top or plan view of the auger-shaft and its knives. Fig. 8 is a side view of the auger and its knives.

This invention relates to improvements in the class of well-augers or earth-boring machines having an endless belt provided with buckets for removing the earth from the auger as it penetrates the ground; and the invention consists in the general construction and arrangement of parts, as will be hereinafter fully described.

To enable others skilled in the art to make and use our invention, we will now proceed to describe the exact manner in which it is carried out.

In the drawing, A represents a circular plate, which is to be bolted to the ground by long bolts $a$. This plate is formed with a round hole, B, and provided with an annular plate, $b$, adapted to receive the disk C, which is formed with a square hole, $c$, through which the auger-shaft D passes, and holes $c'\ c'$, through which the elevator chain or belt E passes.

F represents a beam, having journaled on one end thereof the ground-wheel G, and at its opposite end provided with a square or rectangular hole or slot, $f$, through which the boring or auger shaft passes. H represents a beam secured to and extending at right angles from beam F, and having its outer end supported by a bearing-wheel, $h$. Secured to and extending at right angles from beam H are two parallel beams, I I, in which the belt pulleys or drums J J' are journaled. The journal $j$ of one of said pulleys or drums extends through one of the beams I, and has journaled thereon a cog-wheel, K, which meshes with the cogs or teeth $g'$ on one side of the ground-wheel G, and by means of which the belt pulleys or drums J J' are revolved.

L L' represent two belt-boxes, one fitting within the other, and adjustably connected by the metallic straps $k\ k$. The outer ends of said boxes are respectively hinged or pivoted to the extension D' of the auger or boring shaft and the parallel beams I I.

The object of the adjustable belt-boxes is to provide for lengthening and shortening the same when sections are added to the boring-shaft, the boxes being at full length when an extra section is applied, and gradually shortening as the auger penetrates the ground.

The extension D' of the auger or boring shaft is provided with two band-pulleys or drums, $d\ d'$, over which the elevator belt or chain E, having buckets thereon, passes.

The endless elevator-belt in the present instance is made of leather, and is provided with a series of holes, $e$, by which the belt can be taken up or let out, in order to regulate the tension thereof, as the auger penetrates the ground.

The belt or chain can be made, if desired, of a series of rectangular metallic sections of the same dimensions, which sections are hinged or otherwise flexibly jointed together, so that they may readily adapt themselves to the curvature of the belt pulleys or drums.

The auger M, which we propose to use in connection with the above-described operating mechanism, is of the following construction: It is provided with two spiral grooves, $m\ m^1$, the groove $m$ extending once around the auger and the groove $m^1$ one and a half times around the auger, so that said grooves will both stop on the same side of the auger, whereby the buckets on the elevator chain or belt will catch the dirt.

The auger or boring shaft is provided with transverse bars or four extensions, $m^2$, to which the upper ends of the inclined upright knives $n$ $n^1$ $n^2$ $n^3$ are secured, said knives being of different lengths, and having their lower ends secured to the ridges formed by the grooves of the auger.

The knife $n$ is provided with a boss on the inside thereof, having a hole or journal-bearing, $o$, formed therein for the reception of one end of the shaft of the band-pulley or drum O, the opposite end of said shaft being journaled in the auger-shaft, a space being left below the pulley or drum O for the belt and buckets to pass, said buckets just missing the grooves in the auger. The four vertical and bent or curved curbing-knives P, that cut outside of the upright knives, (so that a person can follow to curb the well,) are hinged or pivoted to the plates $p$, secured to the cross-bars or extensions $m^2$, so that they can be turned or folded in between the upright knives, out of the way of the person curbing the well, when it is desired to draw the auger out of the ground. The object of bending or curving the vertical curbing-knives is to throw the earth toward the center, so that it can be taken up and removed by the endless elevator.

The cross-bars or extensions $m^2$ are made of different lengths, so that, in commencing with upright knife $n$, each following knife will cut outside of the preceding knife, and the curbing-knives, being of the same width and secured to said cross-bars or extensions $m^2$, will also cut in the same manner.

The auger-bit should be made removable in any desired manner, so that it can be readily and easily taken off to be sharpened.

The beam F is provided on its under side with a friction-wheel, $b^1$, which runs on the outer top face of the plate A, and said beam is also provided with a hook, $b^2$, to which a whiffletree can be attached for operating the machine by horse-power.

Sections are to be added to the boring-shaft, and also to the elevator band or chain, (instead of lengthening the chain or band as above described,) in accordance to the depth the auger enters the ground, and the boxes through which the belt or chain runs, being adjustably connected, can be lengthened as additional sections are added to the boring-shaft.

The section $D^1$ or extension of the auger or boring shaft is provided with a groove, $d^1$, within which the tenon $d^2$ of the auger fits, and they are secured together by a bolt or pin, $d^3$, passing transversely through the extension and tenon $d^2$.

The operation of our improved machine is as follows: The beam F, being turned or drawn around by horse or other power, turns the auger or boring shaft, and also the ground-wheel, and the latter, through the medium of the cogs or teeth thereon meshing with cog-wheel K, communicates motion to pulley J', by which the elevator-chain is operated, the buckets thereon taking up and removing the earth as the auger penetrates the ground, whereby the operation of relieving the auger of earth will be continuous, and the bore of the well kept free of the cuttings.

We claim as our invention—

1. In a well-auger or earth-boring machine, the combination, with the auger or boring shaft, of the slotted beam F, cogged ground-wheel G $g'$, cog-wheel K, belt pulleys or drums J J' $d$ $d$ O, and endless elevator belt or chain E, substantially as and for the purpose herein shown and described.

2. The combination, with the auger or boring shaft, of the endless elevating belt or chain and belt pulleys or drums, and the adjustable belt-boxes L L, substantially as and for the purpose herein shown and described.

3. The auger constructed with the spiral grooves $m$ $m^1$, extending around, and both ending on the same side of the auger, substantially as and for the purpose herein shown and described.

4. The combination, with the auger, of the inclined upright knives connected therewith, and arranged to cut the earth in the manner substantially as and for the purpose herein shown and described.

5. The combination, with the auger and shaft, of vertically hinged and bent or curved curbing-knives P, arranged to be turned or folded between the upright knives, substantially as and for the purpose herein shown and described.

6. The combination, with the auger and shaft, of the inclined upright knives and hinged curbing-knives, substantially as and for the purpose herein shown and described.

JAMES CURLEY.
W. F. WARREN.

Witnesses:
RICHD. C. WILSON,
CHAS. E. BOWERS.